United States Patent [19]

Lehtonen et al.

[11] Patent Number: 5,377,810
[45] Date of Patent: Jan. 3, 1995

[54] CONVEYOR SYSTEM

[75] Inventors: Harri Lehtonen; Jorma Kempas, both of Tampere, Finland

[73] Assignee: Lokomo Oy, Tampere, Finland

[21] Appl. No.: 70,219

[22] Filed: Jun. 2, 1993

[30] Foreign Application Priority Data

Jun. 3, 1992 [FI] Finland .................................. 922557

[51] Int. Cl.$^6$ ............................................. B65G 41/00
[52] U.S. Cl. ................................................. 198/303
[58] Field of Search ...................... 198/301, 303, 861.4; 299/43, 45, 56, 64, 67

[56] References Cited

U.S. PATENT DOCUMENTS

| | | | |
|---|---|---|---|
| 2,674,364 | 4/1954 | Cartlidge | 198/303 |
| 2,780,451 | 2/1957 | Alspaugh et al. | 198/303 X |
| 2,923,398 | 2/1960 | Milik | 198/303 |
| 3,031,214 | 4/1962 | Horne et al. | |
| 3,279,584 | 10/1966 | Towles | 198/303 |
| 4,646,906 | 3/1987 | Wilcox, Jr. et al. | 198/303 |
| 5,234,094 | 8/1993 | Weyermann et al. | 198/303 |

FOREIGN PATENT DOCUMENTS

| | | | |
|---|---|---|---|
| 0235235 | 4/1986 | Finland | 198/303 |
| 2702174 | 7/1977 | Germany . | |
| 2719412 | 11/1977 | Germany . | |
| 3040795A1 | 6/1982 | Germany . | |
| 3435328 | 5/1985 | Germany . | |
| 3725595A1 | 2/1989 | Germany . | |
| 1090689 | 11/1967 | United Kingdom . | |

Primary Examiner—James R. Bidwell
Attorney, Agent, or Firm—Burns Doane Swecker & Mathis

[57] ABSTRACT

The invention relates to a conveyor system, which has several conveyors (3/4) joined to together into a chain. There is an articulation (9) at the joining point of the conveyors, which allows the conveyors to turn relative to each other. The chain may be formed and disassembled rapidly. The system is applicable to be used e.g. at mines.

27 Claims, 6 Drawing Sheets

CONVEYOR SYSTEM

FIELD OF INVENTION

The invention relates to transferable material conveyors, which are used e.g. at mines. The invention especially relates to joining the conveyors together into a conveyor chain, to transferring material by means of the chain and to disassembling the chain.

1. Prior Art

For example at mines are used conveyor chains formed from separate belt conveyors, by means of which material is conveyed from the mining site to a process or loading place located at a distance thereof. It is known to form conveyor chains from separate conveyors moving on wheels. A drawback in this case is for example the fact that each conveyor always has to be transferred and set in place separately.

2. Description of Invention

It has now been invented a method for joining the conveyors together into a conveyor chain, for transferring material by means of the chain and for disassembling the chain.

In the inventive method, a conveyor chain is formed, which is provided with at least two conveyors, which are joined together by means of a pivoting articulation. The articulated point is best supported to the ground by means of a support movable along the ground. The support is best placed under the feeding end of the latter conveyor, when seen in the conveying direction. The support member is most preferably a two-wheel pivoting set of wheels, to which is coupled a control equipment. The control equipment may most preferably act also automatically, such that the rollers turn according to the turning angle of said articulated point or of some other articulated point. Manual control is best performed by remote-controlled devices.

The inventive controllable conveyors may be transferred as lines of two or more conveyors by pulling along normal routes available on sites. In this case, one end of the line is fixed to a pulling device. If there is no set of wheels at the fixing end, such a set may be joined thereto, when so desired. The pulling device may be coupled to the end of the line by a articulation, whereby sets of wheels may also be controlled by means of the turning angle of the coupling articulation. A set of wheels is also coupled to the final end of the line, when so needed. If it is also turnable and controllable, the line may easily be transferred also by pushing.

In accordance with the invention, the conveyor chain may be formed and disassembled rapidly. This is a significant advantage especially at mines, where the conveyors have to be transferred from the face to a safe distance during the blasting.

During the usage, the feeding end of the chain is preferably also supported to be movable relative to the ground, and at least the first and the second conveyor are preferably joined together by means of an articulation. The feeding end may thus be transferred without having to increase the number of conveyors or to transfer the entire chain.

Certain preferred embodiments of the invention are described next in detail with reference to the accompanying drawings, in which.

Figure 1:
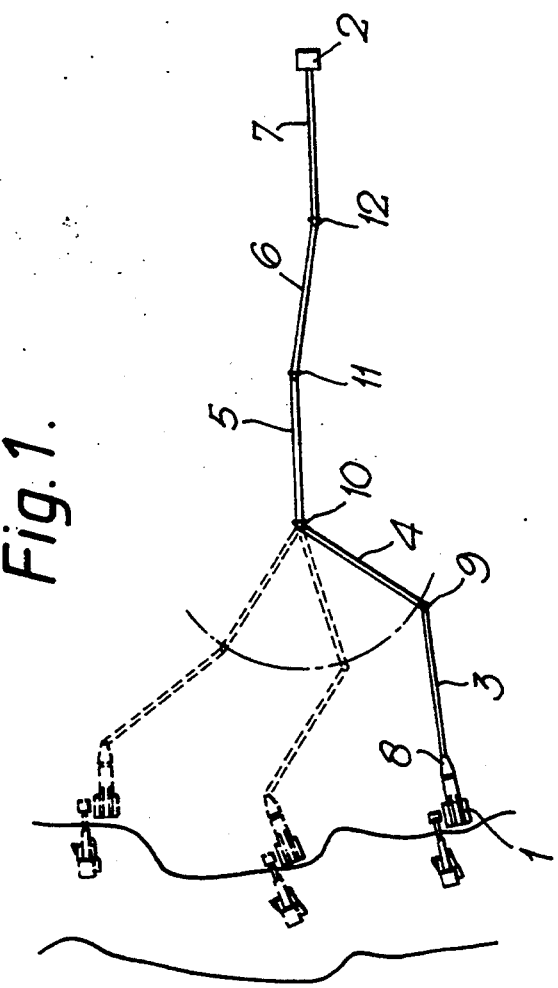
FIG. 1 shows a conveyor system seen from the top.
Figure 2:
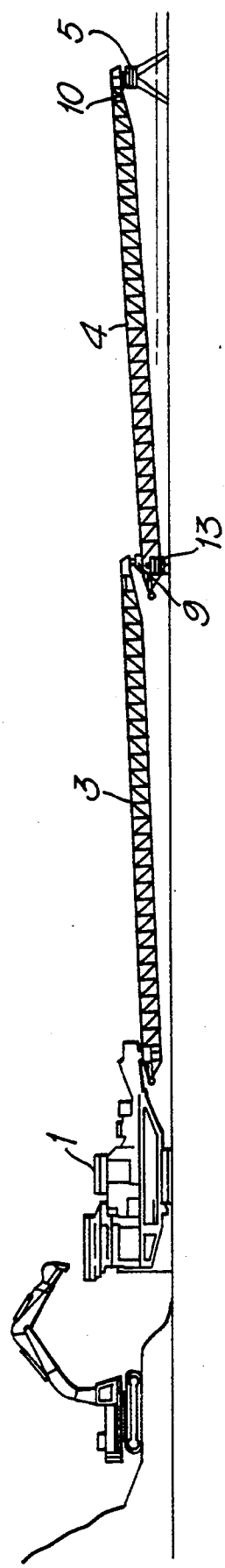
FIG. 2 shows the initial end of the system seen from the side.

In the system according to FIG. 1 and 2, material is conveyed from a work station 1 to a discharge station 2 by means of a chain formed from five conveyors 3-7 joined together. The first conveyor 3 is joined to the work station at a point 8. The mutual joining points of the conveyors are marked with numerals 9-12. The feeding end of the first conveyor 3 is supported onto the work station and the feeding end of the other conveyors 4-7 is supported onto the ground. The discharge end of the conveyors 3-6 is always supported to the feeding end of the next conveyor 4-7.

The work station 1 is movable and the conveyors 3 and 4 are capable of turning relative to each other at the joining point 9 both on the horizontal and vertical level. Also, the joining point 10 of the conveyors 4 and 5 is in a corresponding manner turnable, and the support structure of the feeding end of the conveyor 4 may be moved along the ground. In this way, the work station may move within a wide range without that the conveyors 5-7 have to be transferred. The joining point 8 between the work station and first conveyor is also turnable.

Instead of the movable work station 1, the feeding end of the conveyor 3 may be supported onto the ground e.g. by means of a set of wheels.

The length of the conveyors used in the system may be e.g. 36 m and their number in the chain may amount up to 10-20 each.

In the system of FIG. 2, the work station is a primary crushing unit moving on crawlers, into which unit the mined material is fed by means of an excavator.

The support structure of the feeding end of the conveyor 4 comprises a turnable set of wheels 13 acting as a radial set of wheels. In this way, the conveyor 4 may turn around the fixed joining point 10.

In the turning system of the set of wheels 13 is arranged an electrically driven hydraulic unit with the necessary actuators and control system. The control system may operate manually by means of a radio control or automatically. The automatic control is based on the monitoring of the mutual turning angle of the conveyors 3 and 4 by means of a turning-angle sensor. The turning system is used, when the conveyors are moved during operation and when they are transferred to the chain or removed therefrom.

The support structure of the feeding end of the conveyors 5-7 is also provided with a turnable set of rollers. In this way, the conveyors may be transferred by pulling or pushing.

FIG. 3-6 show the transfer of the conveyors. The conveyors 3-7 are transferred by means of the movable work station 1 or other available work machines 14 by pushing or pulling. One or more conveyors may be transferred in the chain at a time. The joining points 9-12 form the articulations of the chain. In the transferable chain portion there is at the articulated points 9, 11 and 12 and on the opposite end of the work device a turnable fixed set of wheels 13/17 or a removable set of wheels 15/16. In addition, a transfer carriage to be joined to the work device and provided with a similar turnable set of wheels 18 is used. For the transfer, a beam 19 is coupled to the work device. Its joining point 20 may also form an articulation. One end of the beam is coupled to a conveyor or a pulling carriage.

Figure 3:
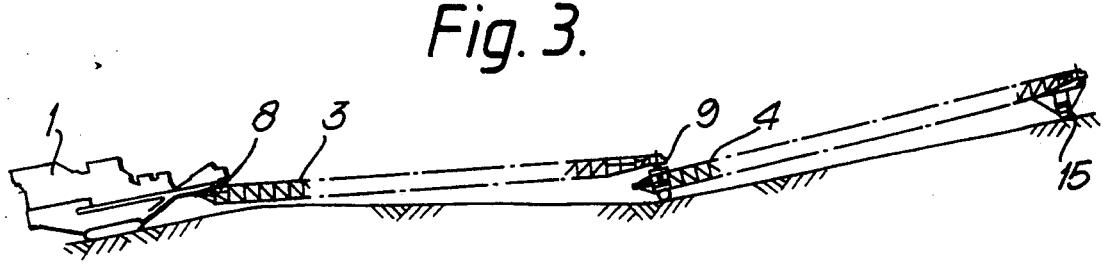
FIG. 3-6 show the transport of the parts of the system seen from the side.

In the dimensioning of the set of wheels and articulated points, a ground clearance needed on the terrain of the site has to be taken into consideration (FIG. 3).

Accordingly, each set of wheels 13 and 15-18 is turnable. In addition, they are provided with a turning-angle sensor, by means of which the turning angle may always be adjusted as desired. Also the articulated points 8, 11, 12 and 20 are provided with a turning-angle sensor, and the set of wheels may be automatically controlled also by means of these sensors.

Figure 7:
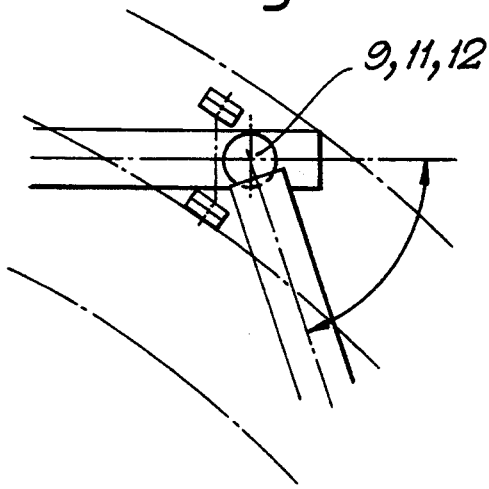
FIG. 7 shows the turning of the joining point of the conveyors seen from the top.

The sets of wheels of the articulated points 9, 11 and 12 of the chain may be controlled automatically according to the mutual turning angle of the conveyors concerned. This is described in FIG. 7. The control geometry is based on the halving of the turning angle on the wheels. If the turning angle is e.g. 70°, the corresponding turning angle of the rollers is thus 35°.

Figure 8:
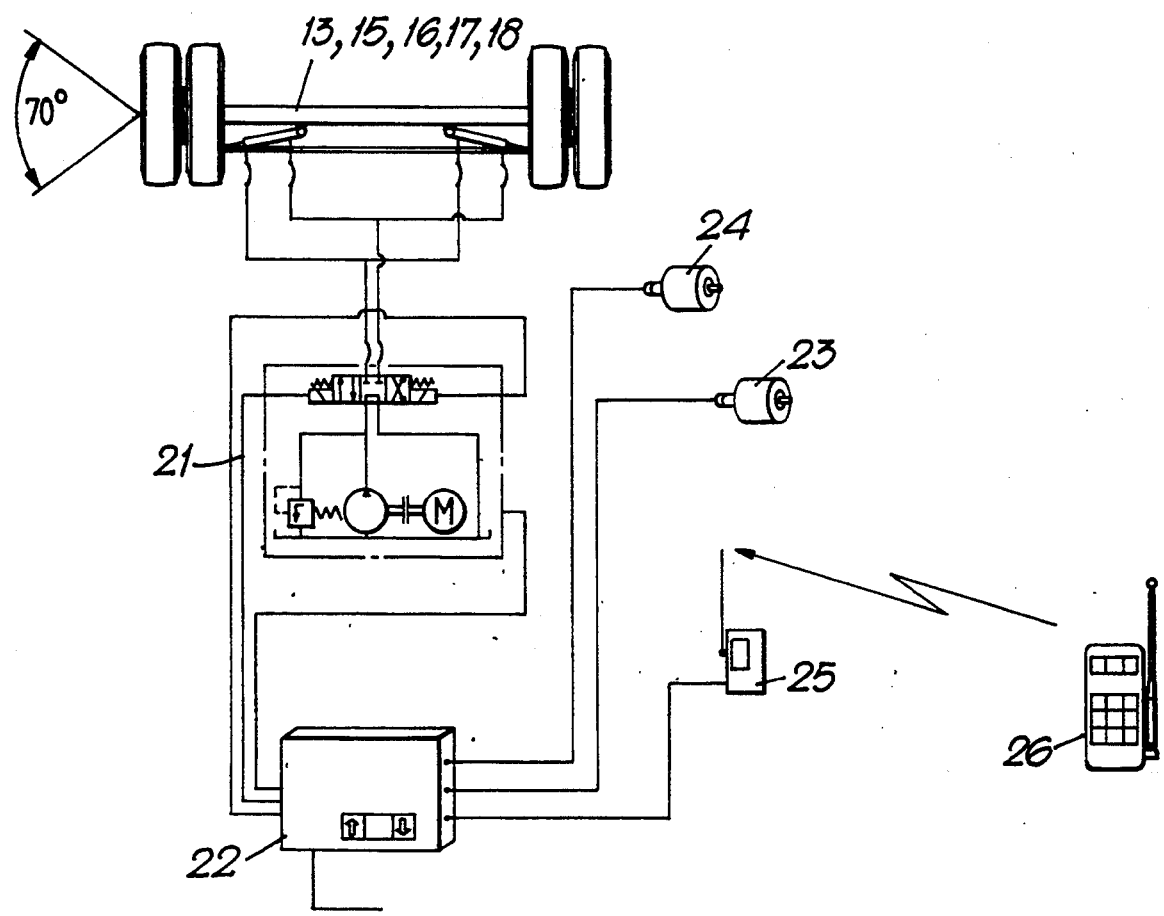
FIG. 8 shows as a diagram the control system of the set of wheels of the conveyors.

FIG. 8 shows a turning system of the set of wheels. The set of wheels is turned by means of a hydraulic unit 21 and its control system 22. To the turning articulated point is connected a turning angle sensor 23 coupled to the control system, and the wheels are turned according to a value provided by the sensor, until a turning angle according to the desired control geometry is reached. The turning angle of the wheels is followed by means of a turning angle sensor 24 connected to the steering pivot joint. In this way, each set of wheels is automatically controlled according to said joint. To the control system are also connected a receiver 25 and a transmitter 26, by means of which the sets of wheels may be manually controlled. Manual control is concerned especially when several conveyors are pushed simultaneously or pulled on very narrow travel passages.

Automatic control may also be arranged such that a set of wheels is controlled by means of a sensor of a preceding or following articulated point.

As a power source of the hydraulic system may act e.g. a 24 V DC unit, which is comprised of a DC motor, a hydraulic pump, a pressure reducing valve and an electrically controlled directional valve.

According to FIG. 3, the conveyors 3 and 4 are transferred by means of the work station 1 fixed to the conveyor 3. The set of wheels 13 is controlled normally automatically according to the sensor of the articulated point 9. When pushing, the set of wheels 15 is controlled normally by manual control. The set of wheel 13 may also be controlled by means of the sensor of the articulated point 8 or of the set of wheels 15.

Figure 4:
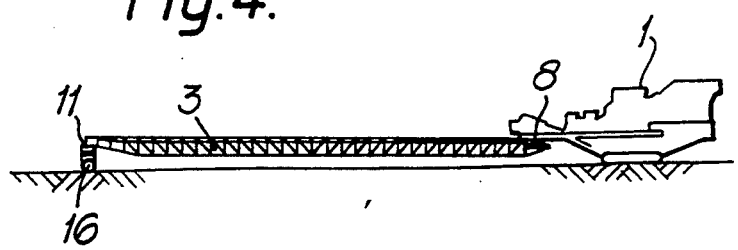

According to FIG. 4, the work station 1 transfers only the conveyor 3. When pushing, the set of wheels 16 is controlled by manual control or automatically by means of the sensor of the articulated point 8. When pulling, automatic control is normally used, based on the sensor of the articulated point 8.

Figure 5:
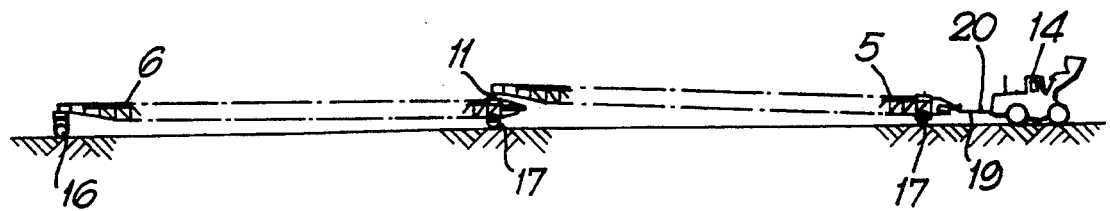

In FIG. 5, the work machine 14 is fixed by means of the beam 19 to the feeding end of the conveyor 5. A set of wheels 17 may be controlled automatically by means of the sensor or the articulated point 20. Otherwise, the control occurs as above.

Figure 6:
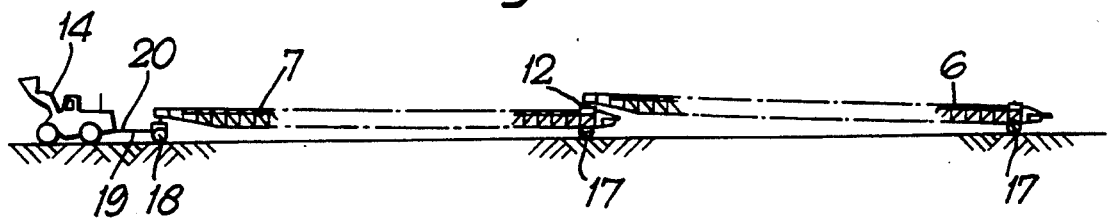

In FIG. 6, to the discharge end of the conveyor 7 is fixed a transfer carriage provided with a set of wheels 18 and thereto by means of the beam 19 the work machine 14. The set of wheels 18 may be controlled by means of the sensor of the articulated point 20. Otherwise, the control occurs as above.

Figure 9:
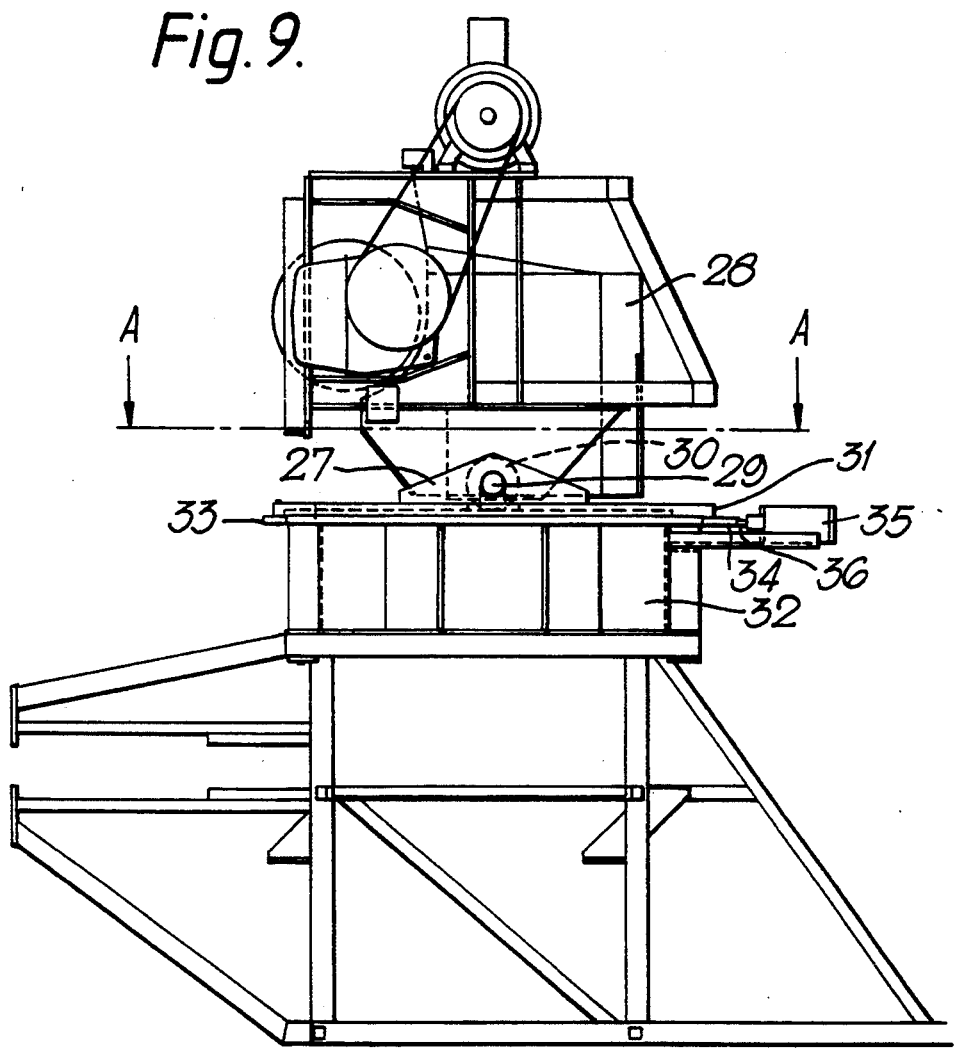
FIG. 9 shows the joining point of two conveyors seen from the opposite side.
Figure 10:
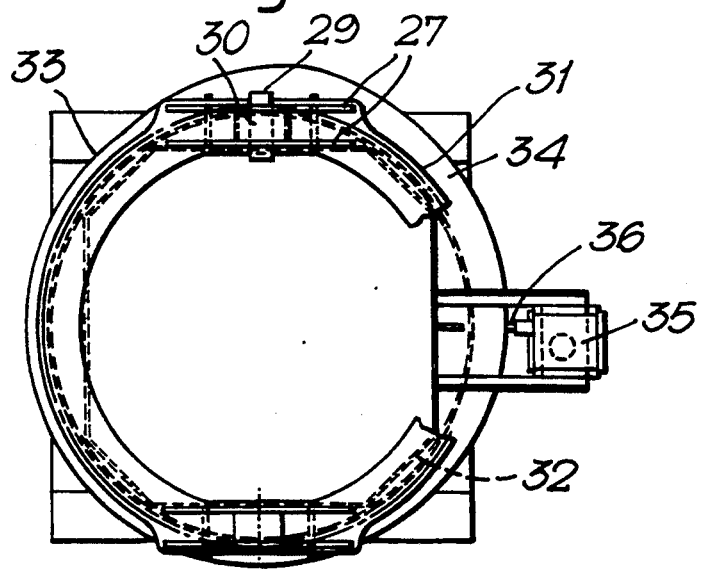
FIG. 10 shows the joining point of FIG. 9 seen along the line A—A of FIG. 9.

FIG. 9 and 10 show a joining point of two conveyors. FIG. 10 is a view taken along the line A—A of FIG. 9.

On both sides of the final end of the feeding conveyor is arranged a fork support 27 formed of two plates, which support has a transverse downwardly-opening groove. The feeding material discharges via a feeding funnel 28 from between supports to the initial end of second conveyor located below. In the groove of both fork supports is fitted a shaft 29 and thereon a roller 30 between the plates of the support. The fork supports are fixed to a ring-shaped roller plate 31. The roller plate has openings for the rollers, through which the rollers press against a ring-shaped turning table 32 fixed to the lower conveyor. Below the roller plate is fixed a ring-shaped counterplate 33 rotating therewith, which counterplate together with the upper part of the turning table simultaneously prevents the structure from rising up. Inside the roller plate is additionally arranged a shoulder, which together with the corresponding edge of the upper part of the turning table prevents the radial transfer of the structure.

The structure described allows tiltings and turnings caused by the terrain and transmits the forces occurring in the transfer of the conveyor chain.

The edge of the counterplate 33 is formed into a profile surface 34, by means of which the turning angle is determined. A corresponding turning-angle sensor 35 has a slide 36 pressing against the profile surface by means of a spring force. The movement of the slide is in turn transmitted mechanically to a turning potentiometer, which thus measures the turning.

Figure 11:
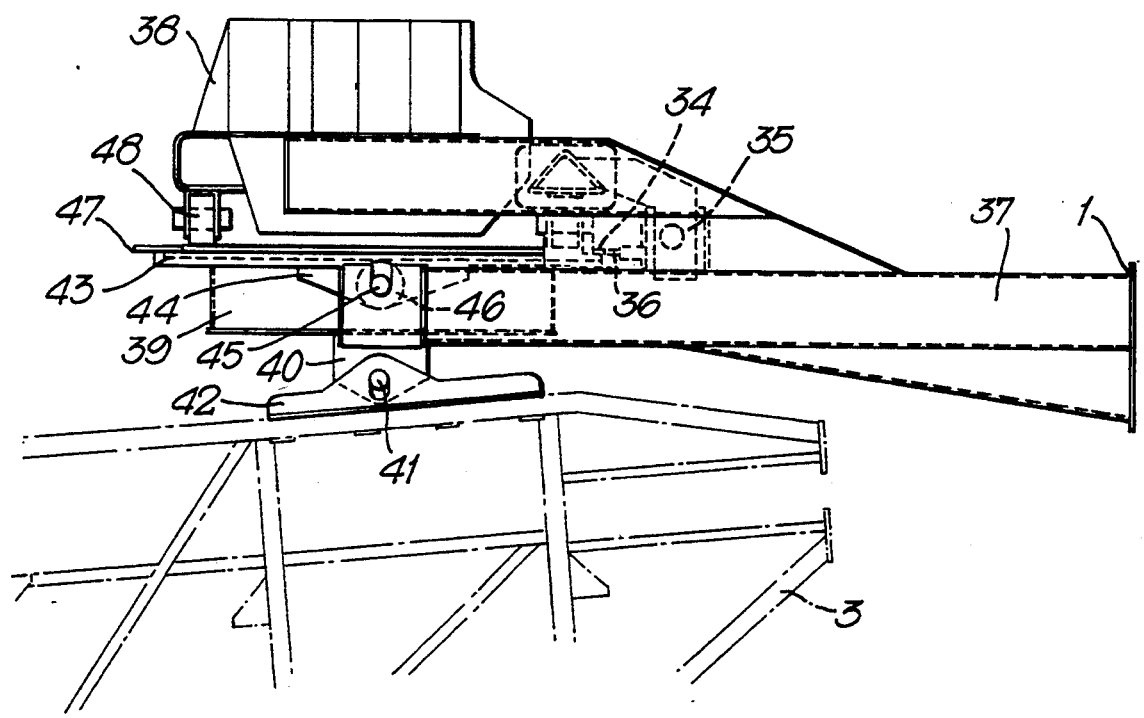
FIG. 11 shows the joining point of the work station and the first conveyor seen from the opposite side.
Figure 12:
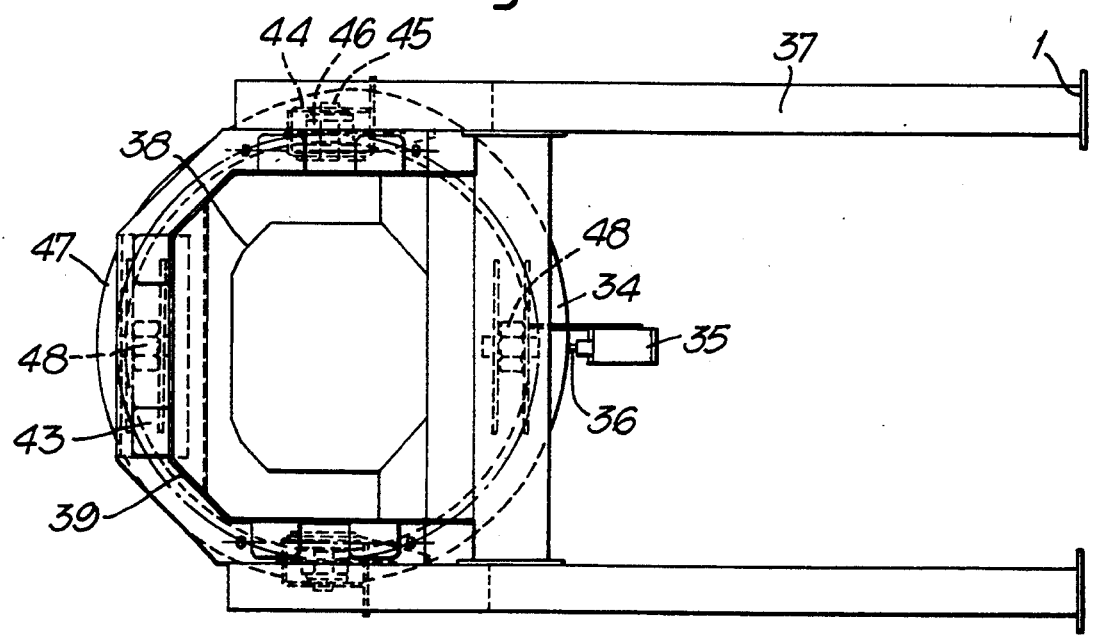
FIG. 12 shows the joining point of FIG. 11 seen from the top.

FIG. 11 and 12 show the joining point of the work station 1 and the conveyor 3. To the work station is fixed a two-beam support 37 and thereto a feeding funnel 38, into which the material to be conveyed is fed. Below the feeding funnel is placed a cylindrical turning table 39, which turns on a support. The turning table has on opposite sides in a downward direction extensions 40, which are by means of articulated pins 41 fixed into vertical notches of fork-like longitudinal support plates 42 located on both sides of the frame of the conveyor 3. In this way, the conveyor 3 suspends on a vertical plane turnably from the turning table 39.

To the support 37 is fixed a fixed ring-shaped roller plate 43, on the opposite side of which are arranged fork supports 44. These have upwardly-opening grooves, on which are mounted shafts 45 and thereon rollers 46. The roller plate has openings at the rollers.

Above the roller plate 43 is located a wider ring-shaped counterplate 47, to the inner edge of which is fixed by its upper edge the turning table 39. In this way, the turning table and the conveyors are capable of turning relative to the support 37.

The roller plate 43 has a shoulder, which together with the counterplate 47 prevents the transverse and axial transfer of the turning table 39. The rising-up of the turning table is prevented by means of longitudinally placed rollers 48 fixed to the support 37.

The edge of the counterplate 47 forms a profile surface 34, from which the turning angle is determined by means of a sensor 35 provided with a slide 36.

The structure described allows tiltings and turnings of the conveyors relative to each other caused by the terrain and transmits the forces occurring in the transfers of the conveyor chain.

Figure 13:
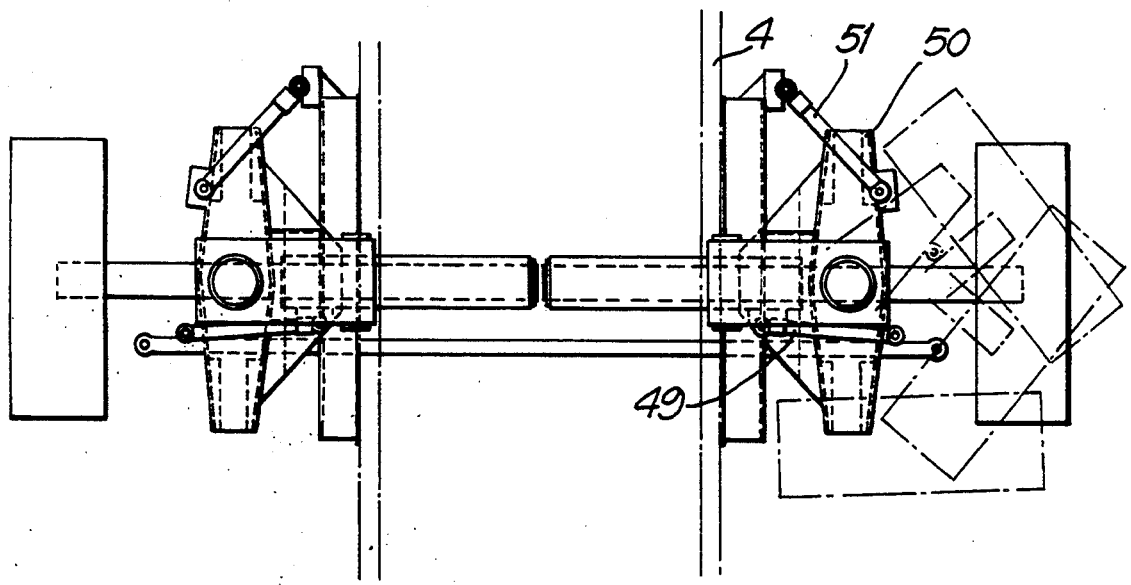
FIG. 13 shows the set of wheels of the joining point of the first two conveyors.

FIG. 13 shows the set of wheels 13 of the joining point of the first two conveyors. First of all, the wheels may be turned by means of hydraulic cylinders 49. In this way, e.g. a turning angle of ca. ±40° is reached. In addition, separate turnable bogies 50 are formed from the shaft by cutting, which are rotated by means of cylinders 51. The wheels may thus turn by altogether ±90°, i.e. transversely relative to the conveyor 4.

In the fixed sets of wheels 17, in the removable sets of wheels 15 and 16 and in the set of wheels 18 of the transfer carriage is used a normal shaft system driven by hydraulic cylinders, which system allows e.g. a necessary turning angle of ca. 40°.

When so needed, the shaft systems are furnished with a suitable springing.

Figure 14:
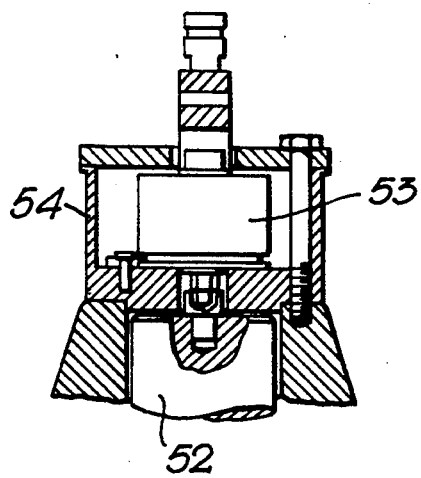
FIG. 14 shows a turning-angle sensor of the set of rollers seen from the side.

Also the steering pivot joints of the shaft systems are provided with a turning-angle sensor. In the solution of FIG. 14, a turning potentiometer 53 is fixed to the steering pivot joint 52. The potentiometer is protected with a detachable protective case 54.

Figure 15:
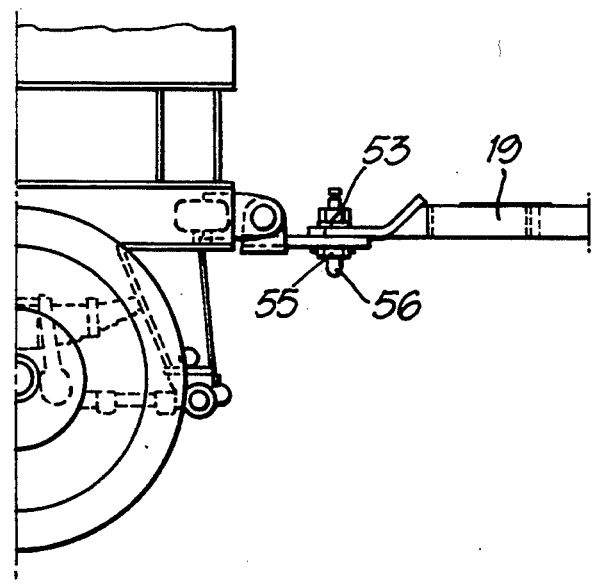
FIG. 15 shows the coupling of a conveying beam seen from the side.

Also the articulated point 20 of the work device 14 and beam 19 is provided with a corresponding potentiometer sensor (FIG. 15). The structure is best designed such that a journal 55 of the articulated joint is substantially subjected to a shearing force only. The connection is provided with a suitable quick locking 56. After the connection, the turning angle of the wheels 17/18 and the beam have to correspond to each other. The positioning of the turning angle of the sensor to a correct place has been realized with a fixed locking sleeve and a locking pin. Alternatively, the sensor case may be turned, until the angles correspond to each other.

Also a potential articulated point of the conveyor and the beam 19 is most preferably furnished with a sensor.

We claim:

1. A method for joining at least two longitudinal conveyors provided with a feeding and a discharge end such that the discharge end of the preceding conveyor is always joined to the feeding end of the following conveyor, whereby a conveyor chain is formed which has a feeding end and a discharge end and at least one joining point, for transporting material by means of the chain from the feeding end to the discharge end, and for disassembling the chain, comprising the steps of:
   forming a conveyor chain such that in at least one joining point, the conveyors are joined to each other by an articulation which allows the conveyors to turn relative to each other on a horizontal plane and a vertical plane, the articulation being supported on the ground by a movable support;
   supporting the feeding end of the chain on a support extending from a crushing unit so that the feeding end is turnable relative to the crushing unit;
   transporting material from the feeding end of the chain to its discharge end; and
   disassembling the chain.

2. A method according to claim 1, wherein the feeding end of the conveyor is supported on the crushing unit by suspending the feeding end from the support extending from the crushing unit.

3. A method according to claim 1, wherein the articulated point is supported onto the ground by means of a turnable set of wheels.

4. A method according to claim 3, wherein the set of wheels is fixed to the feeding end of the latter conveyor.

5. A method according to claim 4, wherein the set of wheels may be turned by ±90° from the longitudinal direction of the conveyor.

6. A method according to claim 1, wherein the feeding end of the conveyor chain is joined to the crushing unit by an articulation which allows the conveyor and the crushing unit to turn relative to each other at least on a horizontal plane.

7. A method according to claim 1, wherein the feeding end of the conveyor chain is joined to the crushing unit by an articulation which allows the conveyor and the crushing unit to turn relative to each other both on a horizontal and vertical plane.

8. A method according to claim 1, wherein
   a conveyor chain is formed such that in at least one joining point starting from the feeding end, the conveyors are joined to each other by means of an articulation; and
   material is transported, and the support device of the feeding end is moved without disassembling the conveyor chain.

9. A method according to claim 8, wherein a conveyor chain is formed, which has at least three conveyors such that also in at least a second joining point, the conveyors are joined to each other by means of an articulation.

10. A method according to claim 1, wherein, when the conveyor chain is formed or disassembled, the conveyors are transferred by pulling or pushing one at a time chain sections formed by one or more conveyors.

11. A method according to claim 10, wherein chain sections formed by at least two conveyors are transferred by pulling or pushing the chain sections simultaneously.

12. A method according to claim 10, wherein at least one conveyor has a turnable set of wheels, which is controlled during the transfer.

13. A method according to claim 12, wherein the set of wheels is controlled automatically.

14. A method according to claim 12, wherein the set of wheels is located at the end of the conveyor and that said conveyor end is joined to a second conveyor by means of an articulation or to a pulling or pushing device by means of an articulation which allows the conveyor and the pulling or pushing device to turn relative to each other at least on a horizontal plane and that the wheels are controlled according to the turning angle of the horizontal plane of the articulation located at the end of the conveyor concerned.

15. An apparatus for transporting material, comprising:
   a conveyor chain formed of at least two conveyors, each conveyor having a feeding end and a discharge end, the conveyors being joined successively with the discharge end of a preceding conveyor joined to the feeding end of a following conveyor so that the conveyor chain has a feeding end and a discharge end;

a joint supporting a feeding end of a first conveyor on a support extending from a crushing unit, the feeding end of the first conveyor being turnable relative to the support on at least a horizontal plane; and, an articulation joining at least two conveyors of the chain, the articulation allowing the joined conveyors to turn relative to each other on a horizontal plane and a vertical plane, the articulation being supported on the ground by a movable support.

16. An apparatus according to claim 15, wherein the articulation comprises:

a horizontal roller plate provided with an opening at the discharge end of the preceding conveyor, on which the conveyor is mounted to be turnable on a vertical plane;

a turning table provided with an opening at the feeding end of the latter conveyor such that the roller plate and the turning table are turnable relative to each other on a horizontal plane;

means for keeping the roller plate and the turning table of the discharge end in place laterally and side by side in a vertical direction; and means for feeding material from the preceding conveyor through the roller plate and the turning table to the latter conveyor.

17. An apparatus according to claim 16, wherein the joint connecting the feeding end of the first conveyor to the crushing unit includes means for the crushing unit and the conveyor to turn relative to each other at least on a horizontal plane.

18. An apparatus according to claim 16, wherein the articulation is supported on a turnable set of wheels.

19. An apparatus according to claim 16, wherein there is a turnable set of wheels at one end of the chain.

20. An apparatus according to claim 16, wherein to one end of the chain is fixed a beam, which is joined to a pulling or pushing device.

21. An apparatus according to claim 18, wherein the turnable set of wheels is turnable by 90° from a longitudinal direction of the conveyor.

22. An apparatus according to claim 21, wherein the turnable set of wheels includes turnable bogies formed in a wheel shaft.

23. The apparatus according to claim 15, wherein the feeding end of the first conveyor is suspended below the fixed support on pivot pins for movement of the feeding end relative to the support in a vertical plane.

24. The apparatus according to claim 15, wherein the joint comprises:

a turning table having oppositely located downward extensions;

support plates extending upward from the first conveyor and aligning with the downward extensions;

articulated pins pivotally fastening the downward extensions to the support plates so that the feeding end is suspended below the arm and is pivotable relative to the support arm in a vertical plane; and, means for rotatably supporting the turning table on the support for rotation horizontally relative to the support.

25. The apparatus according to claim 24, wherein the support includes a pair of horizontally extending arms and the means for rotatably supporting the turning table includes a roller plate fixed to the arms and rollers mounted to the roller plate and defining a roller surface above the roller plate, the turning table being supported on the roller surface.

26. The apparatus according to claim 24, wherein the turning table includes a vertical cylindrical portion and a planar, ring-shaped portion attached at an upper end of the vertical portion, the downward extensions being fixed to the cylindrical portion.

27. The apparatus according to claim 24, wherein the support comprises a pair of horizontally extending arms, each arm branching at a free end to upper and lower portions, the roller plate being attached to the lower portions of the arms, and further comprising additional rollers attached to the upper portions of the arms and extending downward to constrain the ring-shaped portion of the turning table in contact with the rollers of the roller plate.

* * * * *